United States Patent [19]
Ishii et al.
[11] 3,803,366
[45] Apr. 9, 1974

[54] DUPLEX COMMUNICATION SYSTEM USING PLURALITY OF HAND SETS

[75] Inventors: Izumi Ishii; Koju Kawai; Katsumi Ushiyama, all of Tokyo, Japan

[73] Assignee: Kokusai Denki Kabushiki Kaisha, Tokyo-To, Japan

[22] Filed: Dec. 30, 1971

[21] Appl. No.: 213,916

[52] U.S. Cl. .................................... 179/82, 325/51
[51] Int. Cl. ............................................ H04b 5/06
[58] Field of Search....... 179/82, 15 PS, 15 PD, 2.5; 343/175; 325/51; 178/2 D, 58

[56] References Cited

UNITED STATES PATENTS

| | | | |
|---|---|---|---|
| 3,426,278 | 2/1969 | Van Der Valk | 325/49 |
| 3,609,247 | 9/1971 | Halstead | 179/82 |
| 2,980,793 | 4/1961 | Daniel | 179/82 |
| 2,405,501 | 8/1946 | Halstead | 179/82 |
| 2,611,075 | 9/1952 | Marlowe | 179/82 |
| 3,400,221 | 9/1968 | Wolters | 179/2.5 R |
| 3,323,063 | 5/1967 | Walker | 179/82 |
| 3,116,473 | 12/1963 | Gunn | 179/82 |

*Primary Examiner*—Kathleen H. Claffy
*Assistant Examiner*—Thomas D'Amico
*Attorney, Agent, or Firm*—Robert E. Burns; Emmanuel J. Lobato

[57] ABSTRACT

A duplex communication system including a fixed station and a plurality of hand sets. The transmitter of the fixed station is coupled to a propagating conductive pair line for propagating, by an induction magnetic field therefrom, a first carrier modulated by a first voice signal. Each of a plurality of hand sets receives the first carrier by use of a first antenna sensitive to the induction magnetic field to detect the first voice signal to be transmitted from the hand set and further transmits a second carrier modulated by a second voice signal. At least one auxiliary receiver coupled to a medium point of the propagating conductive pair line receives the second carrier by a second antenna sensitive to a space wave field from the first antenna to detect the second voice and to apply the detected second voice to the propagating conductive pair line. The receiver of the fixed station is coupled to the propagating conductive pair line for receiving the detected second voice signal from the propagating conductive pair line. A part of the voice output of the receiver of the fixed station may be applied to the input of the transmitter of the fixed station for further modulating the first carrier by the second voice. A power may be supplied to the auxiliary receiver through the propagating conductive pair line.

2 Claims, 2 Drawing Figures

DUPLEX COMMUNICATION SYSTEM USING PLURALITY OF HAND SETS

This invention relates to communication systems using hand sets and, more particularly, to a communication system including a fixed station and a plurality of hand sets.

Conventional communication systems of the type are usually a two-way system using press-to-talk switches. Accordingly, an operator of a hand set is largely limited to freely handle his both hands. Moreover, if communication is performed only among the hand sets without the fixed station, sufficient characteristics of communication for relatively long distance or for a path including shield substance cannot be obtained since the hand set has a small power. In another communication system of the type, such as an inductive radio system, communication is performed by utilizing a magnetic field generated from a conductive line which is arranged within a desired communication area and connected to a radio transmitter for generating a high frequency wave modulated by a voice signal. In the latter system, while transmission against a hand set having a distance of about 50 meters from the propagating conductive line can be performed, transmission from the hand set can be performed in only a very short distance against the propagating conductive line due to a small power of the hand set.

An object of this invention is to provide a duplex communication system using a plurality of hand sets capable of eliminating the above defects of conventional arts.

In accordance with the principle of this invention, while communication from a fixed station to hand sets is performed by an inductive radio system, communication from the hand sets to the fixed station is performed by a space wave radio system. At least one receiver coupled to a propagation conductive pair line is provided for covering a group of hand sets, so that the voice output of the receiver is applied to the fixed station through the propagating conductive pair line. Accordingly, communication quality between the fixed station and each hand set is effectively improved. Moreover, a part of a voice output of the fixed station may be again transmitted from the fixed station through the propagating conductive pair line, so that communication quality between the hand sets can be also improved without affection by shield substance in the service area and by a distance between two of the fixed station and the hand sets.

Figure 1:
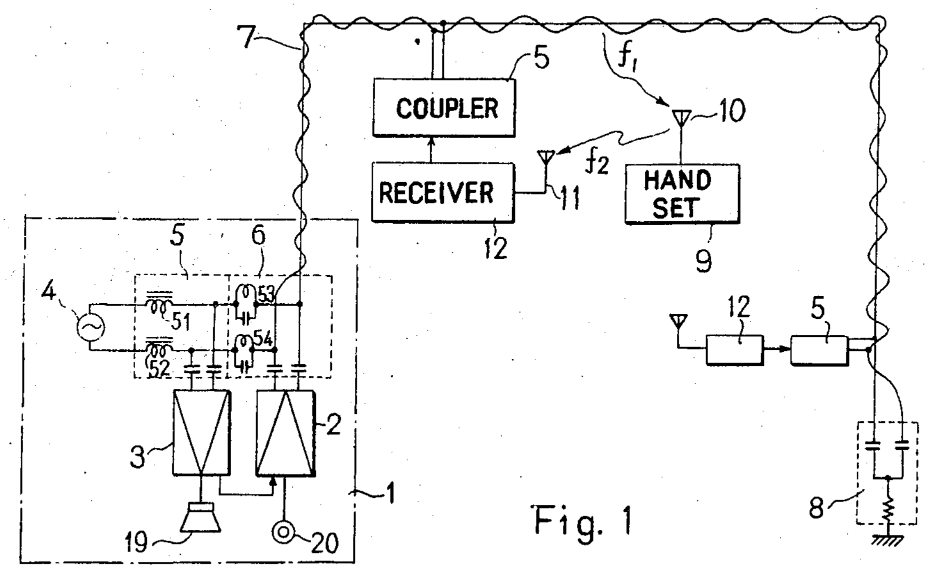
Figure 2:
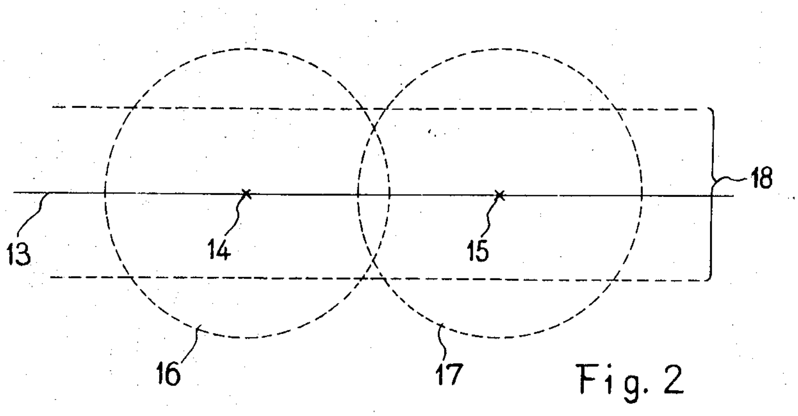

The principle, construction, and operation of this invention will be understood from the following more detailed discussion taken in conjunction with the accompanying drawings, in which FIG. 1 is a connection diagram illustrating an embodiment of this invention; and FIG. 2 is a diagram explanatory of the operation of the embodiment shown in FIG. 1.

With reference to FIG. 1, an embodiment of this invention comprises a fixed station 1, a stranded pair line 7 connected to the fixed station or main communication station at one end and to a matching load 8 at the other end, receiving means including receivers 12 each having an antenna 11 and each connected to the pair line 7 through a coupler 5, and a plurality of hand sets or transceivers 9 each having receiving and transmitting means including an antenna 10. For simple illustration, only one hand set 9 is illustrated. The antenna 10 is sensitive to an induction field from the pair line 7. The antenna 11 is sensitive to a space wave or radiation field from the antenna 10. The fixed station 1 comprises transmitting means including a transmitter 2 coupled through coupling capacitors to the pair line 7, a line coupler 6 having high frequency choke coils 53 and 54 against a carrier wave from the transmitter 2, a power source 4, a coupler 5 for connecting the source 4 to the choke coils 53 and 54 through respectively low frequency choke coils 51 and 52 receiving means including, a receiver 3 connected through coupling capacitors to junctions between the line coupler 6 and the coupler 5, a speaker 19 connected to the output of the receiver 3, and a microphone 20 connected to the input of the transmitter 2. The pair line 7 is arranged for covering the whole service area. In a building, the pair line 7 is arranged on the floor, the wall, or the ceiling. In the outdoors, the pair line 7 is arranged along side walls of constructions, and on a fence or fences, or as an aerial system of external wiring. The pair line 7 connected to the ground at the transmitter 2 and the load 8 form a ground-return typed high frequency circuit. The ground provided at the transmitter 2 is omitted in FIG. 1 for simple illustration. By way of example, one terminal of a secondary winding of an output transformer of the transmitter 2 is grounded.

In operation, the power of the receivers 12 is supplied from the power source 4 through the couplers 5 and 6, the pair line 7 and the coupler 5. The transmitting output of the transmitter 2 is applied to pair line 7 and radiated in the air from the pair line 7 so as to produce a magnetic field of a carrier frequency $f_1$ modulated by a first voice signal from microphone 20. The magnetic field is detected by the antenna 10 of the hand set 9, so that the transmitted first voice signal can be received by the hand set 9.

If a second voice signal is to be transmitted from the hand set 9, a carrier wave of frequency $f_2$ modulated by the second voice signal is applied to the antenna 10 from the hand set 9. The carrier wave of frequency $f_2$ is transmitted from the antenna 10 to a receiving antenna 11 of the nearest one of the receivers 12, so that the transmitted second voice signal is received by the receiver 12 and then applied to the receiver 3 through the coupler 5, the pair line 7, and the coupler 6 and 5.

The receivers 12 are provided densely at weak power areas and sparsely at strong power areas for making communication quality uniform.

A part of the voice output of the receiver 3 may be applied to the input of the transmitter 2 and again transmitted through the propagating conductive line 7. Accordingly, the second voice signal from the hand set 9 can be also received by all of other hand sets 9 not shown.

A receivable area for a hand set 9 is a zone 18 of about 50 meters from a propagating conductive line 13 as shown in FIG. 2 if the transmitter 2 has a power of about 10 watts. On the other hand, the receiver 12 positioned at a point 14 or 15 has a receivable zone 16 or 17 having a radius of about 100 meters at an open field as shown in FIG. 2 if the receiver 12 has a minimum receivable field intensity of about one milli-watts at a frequency band of 140 mega-Herz. Zones common to the zone 18 and the zones 16 and 17 are the service area of the system of this invention.

What we claim is:

1. A duplex communication system, comprising a propagating conductive pair line disposed in a desired service area of the system; a load connected between one end of said propagating conductive pair line and ground; a transmitter coupled to the other end of said propagating conductive pair line for applying a first carrier wave modulated by a first voice signal to be transmitted thereby developing an induction magnetic field from said propagating conductive pair line; a plurality of hand sets each having a first antenna sensitive to said induction magnetic field, receiving means and transmitting means, said receiving means coupled to said first antenna for detecting said first voice signal from said first carrier wave, said transmitting means coupled to said first antenna for developing a radiation field for transmitting a second carrier wave modulated by a second voice signal; at least one first receiver coupled to a medium point of said propagating conductive pair line and having a second antenna sensitive to said radiation field for detecting said second voice signal from said second carrier wave and for applying the second voice signal to said propagating conductive pair line; a second receiver coupled to said other end of said propagating conductive pair line for receiving and amplifying the second voice signal from said propagating conductive pair line; a speaker connected to the output of said second receiver; an electrical power source coupled to said propagating conductive pair line for applying a power to said first receiver through said propagating pair line; dc transmissible low frequency choke means and dc transmissible high frequency choke means coupling said power source to said propagating conductive pair line; coupling capacitors connecting said transmitter between said dc transmissible high frequency choke means and said propagating conductive pair line; coupling capacitors connecting said second receiver between said dc transmissible low frequency choke means and said dc transmissible high frequency choke means; and in which said load comprises two series-connected capacitors and a resistor connected to a common junction between said two capacitors at one terminal, the other terminal of said resistor being connected to the ground, two terminals of said series-connected two capacitors being respectively connected to two terminals of two conductors of said propagating conductive pair line.

2. A duplex communication system according to claim 1, in which a part of the output of said second receiver is applied to the input of said first mentioned transmitter so that said first carrier wave is modulated by said second voice signal for transmission thereof.

* * * * *